(12) United States Patent
Reisch

(10) Patent No.: US 9,239,109 B2
(45) Date of Patent: Jan. 19, 2016

(54) DEVICE FOR SHIFTING AT LEAST ONE FREEWHEEL ON AN ASSOCIATED SHAFT OF A GEAR MECHANISM

(75) Inventor: Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 463 days.

(21) Appl. No.: 12/921,745

(22) PCT Filed: Feb. 20, 2009

(86) PCT No.: PCT/EP2009/052011
§ 371 (c)(1),
(2), (4) Date: Oct. 25, 2010

(87) PCT Pub. No.: WO2009/112341
PCT Pub. Date: Sep. 17, 2009

(65) Prior Publication Data
US 2011/0048156 A1 Mar. 3, 2011

(30) Foreign Application Priority Data
Mar. 13, 2008 (DE) .......................... 10 2008 000 643

(51) Int. Cl.
  *F16H 59/00* (2006.01)
  *F16H 63/30* (2006.01)
  *F16D 21/04* (2006.01)
  *F16H 61/32* (2006.01)

(52) U.S. Cl.
CPC .............. *F16H 63/304* (2013.01); *F16D 21/04* (2013.01); *F16H 61/32* (2013.01); *F16H 2063/3063* (2013.01); *Y10T 74/20177* (2015.01)

(58) Field of Classification Search
CPC .......... F16H 3/089; F16D 21/04; F16D 23/06
USPC ....................................... 74/473.36
See application file for complete search history.

(56) References Cited

U.S. PATENT DOCUMENTS 4,223,773 A * 9/1980 Croisant et al. ............ 192/48.91
4,579,204 A * 4/1986 Iio ................................. 192/21

(Continued)

FOREIGN PATENT DOCUMENTS

DE      10225331 A1    12/2003
DE    102006049274      4/2008

(Continued)

OTHER PUBLICATIONS

International Search Report for International Application No. PCT/EP2009/052011, dated Nov. 19, 2009, 2 pages.

(Continued)

*Primary Examiner* — William Kelleher
*Assistant Examiner* — Zakaria Elahmadi
(74) *Attorney, Agent, or Firm* — Brinks Gilson & Lione

(57) ABSTRACT

The invention relates to an arrangement for shifting at least one freewheel (1, 2, 3) on an associated shaft of a gear mechanism, comprising at least one shifting device which comprises an actuation device and a non-positive and/or positive shifting device. Said shifting device can be axially displaced by the actuation device that is arranged at least partially in the shaft and the shifting device is arranged coaxially to the shaft. According to the invention, an axial extension can be disposed between the actuation device and the shifting device.

18 Claims, 3 Drawing Sheets

(56) References Cited

U.S. PATENT DOCUMENTS

Figure 1:
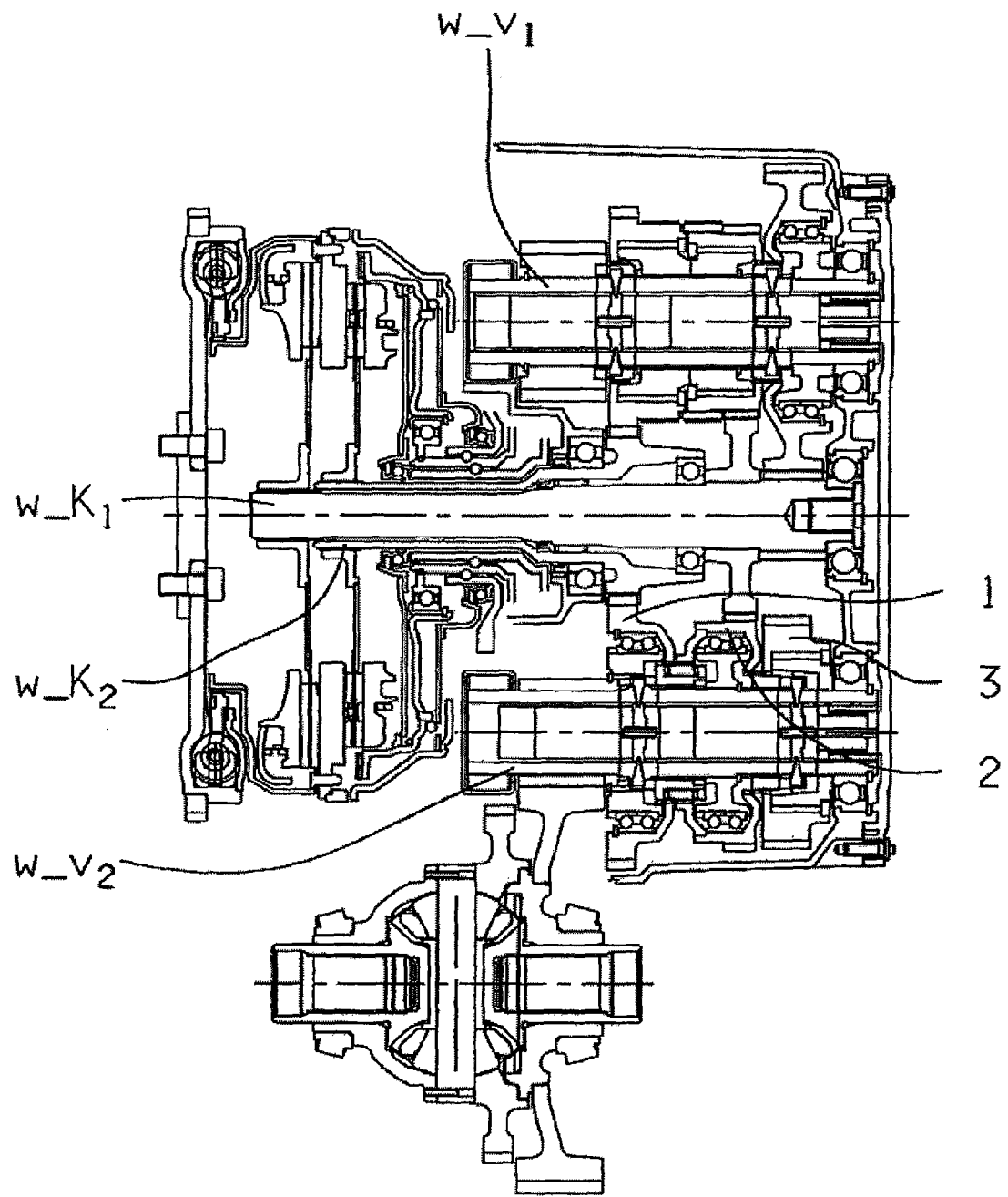

| | | | |
|---|---|---|---|
| 4,782,929 A * | 11/1988 | Muller | 192/53.35 |
| 5,006,084 A * | 4/1991 | Handa | 440/75 |
| 5,214,974 A * | 6/1993 | Morbidelli | 74/371 |
| 5,547,057 A * | 8/1996 | Sperber | 192/53.34 |
| 5,651,435 A * | 7/1997 | Perosky et al. | 192/219 |
| 5,803,218 A * | 9/1998 | Perosky et al. | 192/215 |
| 5,845,754 A * | 12/1998 | Weilant | 192/53.35 |
| 5,863,270 A * | 1/1999 | Chen et al. | 475/289 |
| 5,996,436 A * | 12/1999 | Dreier et al. | 74/473.21 |
| 6,109,128 A * | 8/2000 | Mazet | 74/339 |
| 6,544,083 B1 * | 4/2003 | Sawyer et al. | 440/75 |
| 6,675,667 B1 * | 1/2004 | Pelletier et al. | 74/333 |
| 6,817,461 B1 * | 11/2004 | Sawyer et al. | 192/93 R |
| 6,886,673 B2 * | 5/2005 | Burger | 192/53.4 |
| 6,993,991 B2 * | 2/2006 | Baasch et al. | 74/355 |
| 7,353,726 B2 * | 4/2008 | Beer et al. | 74/340 |
| 7,370,742 B2 * | 5/2008 | Rudle | 192/48.91 |
| 7,451,670 B2 * | 11/2008 | Ebenhoch et al. | 74/473.37 |
| 7,487,693 B2 * | 2/2009 | Kiene et al. | 74/473.36 |
| 8,020,682 B2 * | 9/2011 | Saito et al. | 192/53.362 |
| 8,069,744 B2 * | 12/2011 | Di Martino | 74/339 |
| 2005/0155446 A1 * | 7/2005 | Heathcote | 74/473.25 |
| 2006/0201268 A1 * | 9/2006 | Fink et al. | 74/339 |
| 2010/0043586 A1 | 2/2010 | Mohr et al. | |
| 2010/0294070 A1 * | 11/2010 | Akashi et al. | 74/473.36 |
| 2011/0023649 A1 * | 2/2011 | Kim et al. | 74/473.36 |
| 2011/0100144 A1 * | 5/2011 | Neelakantan et al. | 74/473.36 |
| 2011/0185833 A1 * | 8/2011 | Hackl et al. | 74/339 |
| 2012/0090421 A1 * | 4/2012 | Hagberg | 74/473.12 |

FOREIGN PATENT DOCUMENTS

| | | | | |
|---|---|---|---|---|
| EP | 446087 | A1 * | 9/1991 | F16H 3/08 |
| EP | 1830092 | A1 | 9/2007 | |
| FR | 2658258 | A1 | 8/1991 | |
| WO | WO-2007099153 | * | 9/2007 | F16H 63/30 |

OTHER PUBLICATIONS

International Preliminary Report on Patentability for International Application No. PCT/EP2009/052011, dated Oct. 5, 2010, 7 pages.

Office Action and Search Report from corresponding Chinese Patent Application No. 200980104244.1, dated Jan. 13, 2014.

* cited by examiner

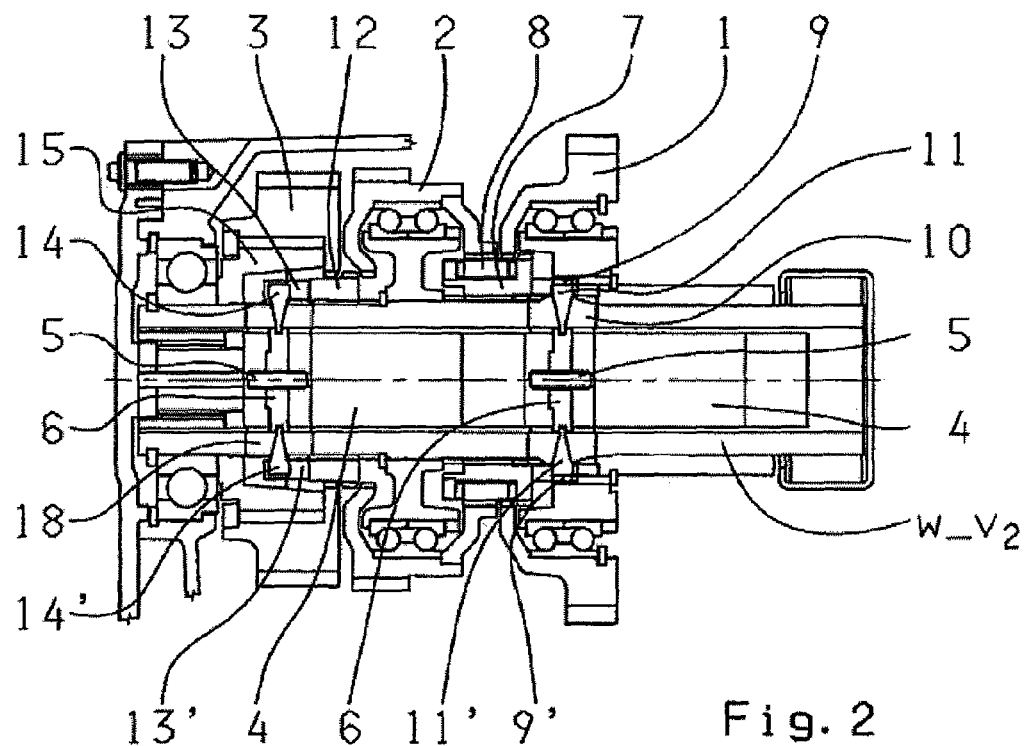
Fig. 2
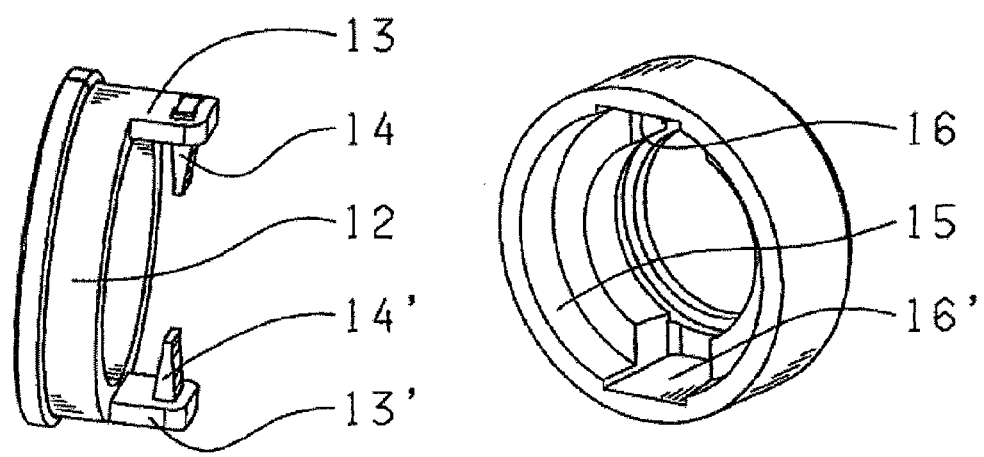
Fig. 3                    Fig. 4

DEVICE FOR SHIFTING AT LEAST ONE FREEWHEEL ON AN ASSOCIATED SHAFT OF A GEAR MECHANISM

This application is a filing under 35 U.S.C. §371 of International Patent Application PCT/EP2009/052011, filed Feb. 20, 2009, which claims priority to German Application No. 10 2008 000 643.2, filed Mar. 13, 2008, each of which is incorporated by reference herein in its entirety.

The present invention concerns an arrangement for shifting at least one idle wheel on an associated shaft in a transmission according to the type described in more detail in the preamble of claim 1.

A device to operate a gear pinion designed as idle wheel in a transmission unit built in countershaft construction is known from a not yet publicized appliance of the applicant DE 10 2006 049 274. The transmission unit includes two recouplings. Each one of them can shift two idle wheels on a countershaft. The recouplings are arranged on the inside of the countershaft, which is designed as a hollow shaft. These activate a sleeve element which is movable axially and coaxially in order to connect the idle wheel with the countershaft rotationally. Since space is limited in the hollow shaft, the options for positioning the recouplings are also limited. Thus also the idle wheels have to be positioned at certain axial locations, so that at least the length of the gear box will increase.

The purpose of the present invention is to propose an arrangement to shift at least one idle wheel of the type previously described, in order to achieve a gear box as compact and cost-effective as possible.

This task is achieved in the characteristics of claim 1 in line with the invention. Further profitable embodiments unfold in the sub claims and drawings.

Thus the invention proposes an arrangement to shift at least one idle wheel on an associated shaft in a transmission with at least one shift appliance, which includes an operating device and a friction-locked and form-fit shift device in which the operating device with the shift device is movable in axial direction and in which the operating device is arranged at least partly inside the shaft and the shift device is arranged coaxially to the shaft. In line with this invention it is possible to design an axial extension, or the like, between the operating device and the shift device.

In this way it is possible to equal out a varying axial position between the operating device and the shift device for any given shift appliance. Hence it is possible to arrange shift appliances into a transmission in a very space-effective way, so that very compact gear boxes e.g. for front transverse mounted engines can be realized. Alternatively it is possible to arrange the axial extension at least partly in a radial direction between an idle wheel bearing and a hollow shaft.

In line with the invention the suggested arrangement can preferably be used in shift appliances where the operating device is arranged inside the hollow shaft. It is also imaginable that one operating device can operate several shift devices or shift elements. But it is also possible to use other operating methods.

For one possible version of the invention it is suggested to arrange several shift appliances according to the invention, which are preferably designed differently. It is also possible that the suggested design consists of identical shift appliances.

According to a further development of the invention it can be intended that the axial extension of each shift appliance is aligned to the shift device. It is also possible that the axial extension is aligned to the operating device or else to another position.

In line with a development of the invention it can be intended that the first shift appliance (e.g. a form-fit shift device) is designed with a sliding sleeve having an axial extension that is moved axially by the operating device. Preferably this axial extension can consist of at least one overhanging pick-up area or the like, to hold at least one driving bolt that is attached to the operating device. The pick-up area can be designed in one piece or also with a sliding sleeve. It is also possible that each pick-up area is attached as a separate part to the sliding sleeve.

In order to realize a most compact construction in radial direction of the gear box as well, it can be designed in such a way that the sliding sleeve with the overhanging pick up area can be accommodated at least partly or at least in one shifting position into a groove, or the like, on the shaft. Alternatively the groove can also be put into the idle wheel bearing.

If the arrangement according to the invention uses different shift appliances, it can be designed in such a way that the additional shift appliance consists of a shift device that uses a movable shift dog with an axial extension which is moved axially by the operating device. Preferably this axial extension can again consist of at least one overhanging pick-up area to hold at least one driving bolt that is attached to the operating device. For this shift appliance it is possible that the pick-up areas are designed in one part or also as multipart versions.

In order to achieve a most compact design in radial direction for the second version of the gearbox as well, the shift dog with its overhanging pick-up area can be arranged at least partly in a radial way in at least one shift position between the idle wheel bearing and the shaft. For that it would be advantageous if the idle wheel bearing shows corresponding grooves, or the like, to receive the overhanging pick up area. It is also possible to choose other constructive possibilities in order to accomplish this radial construction of the various parts.

In line with the invention, it is also possible to use friction-locked shift appliances instead of form-fit shift appliances, or a combination of both.

Preferably a spindle drive designed inside the shaft can be used as operating device, where the spindle nut with its driving bolt has an operative connection for axial movement. It is also possible to use other operating devices. The operating device can be connected to the shaft for co-rotation or also to the housing.

The proposed arrangement can be used for any transmission. Yet, preferably this arrangement can be used for double clutch transmissions designed in countershaft construction for shifting several power shift gears and at least one winding path gear; especially for connecting idle wheels with the respective countershaft, or also for connecting idle wheels to one another independently from the countershaft, in order to achieve a winding path gear or, in other words, to connect the two transmission parts of the double clutch transmission with a shift device that operates from the inside. Furthermore, by means of the invention-based arrangement, it is possible that e.g. several idle wheels can be connected to the associated countershaft at the same time.

The invention on hand will be explained with the use of some drawings, as can be seen on the following pages. The same reference numerals will be used for all parts that are equal.

FIG. 1 a sectional view of an exemplified illustrated double clutch transmission with an arrangement according to the invention.

FIG. 2 an enlarged sectional view of a possible version of the layout according to the invention with two differently constructed shift appliances.

FIG. 3 a three-dimensional view of a shift dog with pick-up areas for the arrangement according to the invention.

FIG. 4 a three-dimensional view of an idle wheel bearing according to the invention.

Figure 5:
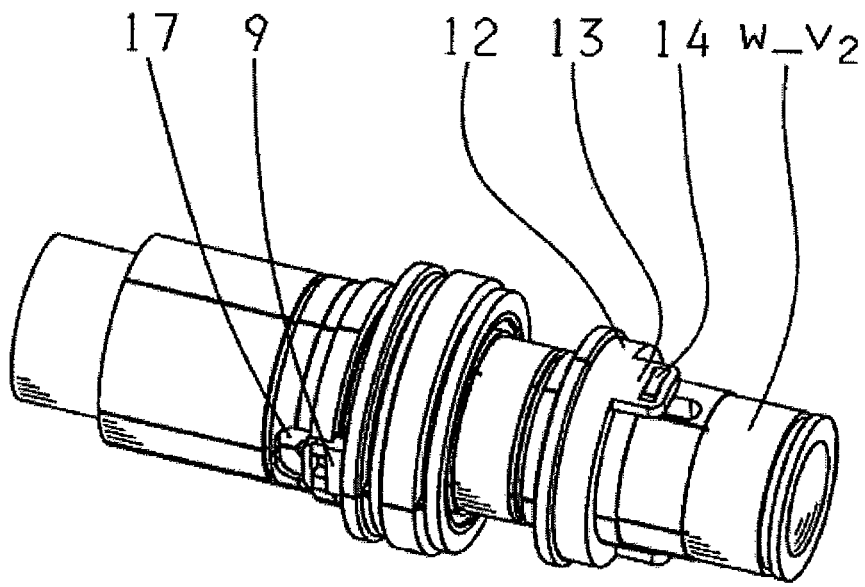
Figure 6:
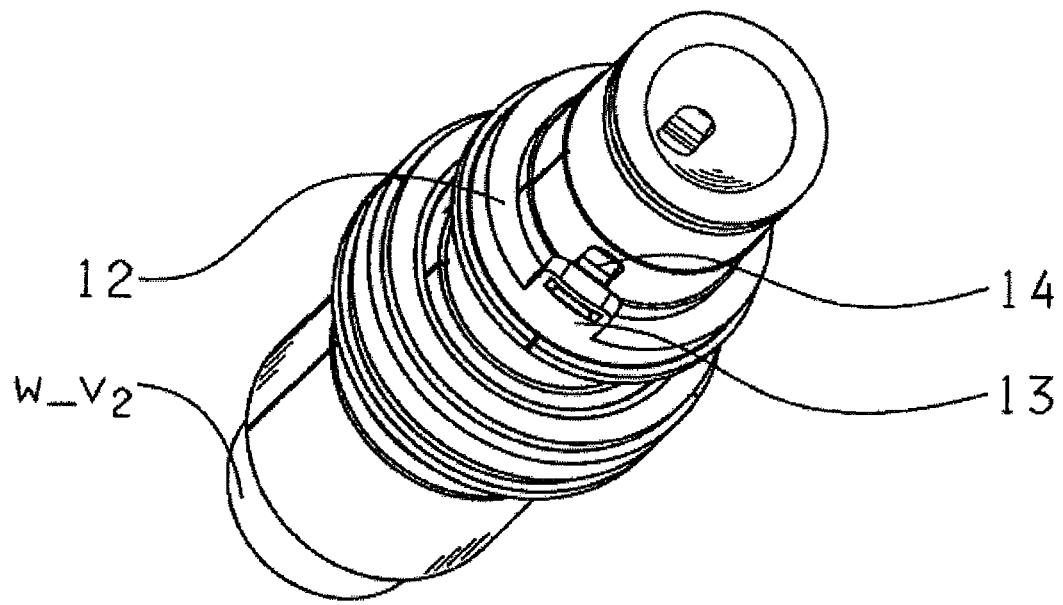

FIG. 5 a three-dimensional partial view of the arrangement according to FIG. 1; and FIG. 6 another three-dimensional partial view of the arrangement according to FIG. 1.

In the partial view of FIG. 1 an exemplified multi speed double clutch transmission in countershaft construction is shown as possible appliance for the arrangement of shifting at least one idle wheel on an associated shaft in line with the invention.

The double clutch transmission includes two clutches, whose input sides are connected to a driving shaft. Furthermore the driving shaft is equipped with a torsion vibration damper. The output sides of the clutches are connected to one of the two coaxially arranged gearbox input shafts $w\_K1$ and $w\_K2$, respectively. The first gearbox input shaft $w\_K1$ is designed as solid shaft and the second gearbox input shaft $w\_K2$ is designed as hollow shaft. Further, two countershafts $w\_v1$ and $w\_v2$ are arranged in an axially parallel way. Each countershaft $w\_v1$, $w\_v2$ consists of several idle wheels, which are in operation with the countershaft $w\_v1$, $w\_v2$ through fixed wheels.

In order to be able to shift the idle wheels of the associated countershafts $w\_v1$ and $w\_v2$, the first countershaft $w\_v1$ is arranged with two shift appliances. The operating devices are built inside of this countershaft since it is designed as a hollow shaft. The operating devices can move form-fit shift devices axially, in order to engage the specified idle wheel with the countershaft $w\_v1$.

The countershaft $w\_v2$ consists of an arrangement to shift the idle wheels 1, 2, 3 in line with the invention. The arrangement exemplifies two differently designed shift appliances, whereby the first shift appliance is engaging idle wheel 1 with the second countershaft $w\_v2$ for co-rotation. Furthermore it is possible that the first operating device can engage idle wheel 1 and 2 with each other independent of the second countershaft $w\_v2$. This allows for a winding path gear of the transmission. The second operating device can connect idle wheel 2, as well as idle wheel 3 individually with the countershaft $w\_v2$ for co-rotation. In line with the invention, the countershaft $w\_(v)1$ can also shift further idle wheels, so that the suggested arrangement of FIG. 1 is only exemplary.

The invention proposes that the operating devices are connected to the shift device with an axial extension in each shift appliance, in order to be more flexible in the axial positioning of the operating and shift devices. In this way it is possible to arrange the parts in a way that requires the least space in a transmission.

FIG. 2 displays an enlarged partial view of the invention which shows the arrangement of the shift appliances rotated by 180°, compared to FIG. 1. Each shift appliance consists of an operating device, which is arranged inside of the countershaft $w\_v2$, designed as a hollow shaft. The spindle drive includes an electric motor 4, which drives a spindle 5 onto which a spindle nut 6 is mounted for co-rotation. The spindle nut stands in operative connection to the shift device or shift element which is coaxially positioned to the countershaft.

The shift appliance on the right side of FIG. 2 is designed with an axially movable sliding sleeve 7. A shift dog 8 is swivel-mounted on the radial outside of that sliding sleeve. In axial direction, the sliding sleeve 7 has two overhanging pick-up areas 9 and 9' which are positioned opposite to each other. They serve as axial extensions and are built into the sleeve 7 or are attached to it. The overhanging pick up areas 9 and 9' comprise the driving bolts 11 and 11' each of which extends in radial direction through the slot hole 10. They are attached to the pick-up areas 9 and 9' in a special groove through caulking, welding, gluing, or the like. It is also possible to use a single piece version. The driving bolts 11 and 11' are in operative connection with the spindle nut 6, so that an axial movement of the spindle nut 6 will also move the sliding sleeve 7 as well as a the shift dog 8 used for engaging the specified idle wheels 1 and 2.

Furthermore, FIG. 2 also displays a second shift appliance, which includes a shift device on the left side that is arranged coaxially toward the second countershaft $w\_v2$, designed with an axially movable shift dog 12. By moving the shift dog 12 axially, it is possible to engage idle wheel 2, as well as idle wheel 3 through certain gears with the second countershaft $w\_v2$ for co-rotation. The operating device of the shift device of the second shift appliance is designed as spindle drive, built inside of this countershaft $w\_v2$, which is also designed as a hollow shaft. This spindle drive is either attached to the countershaft $w\_v2$ or with the housing. It is identical to the spindle drive of the first shift appliance, so that the same descriptions can be used for parts that are identical.

Differing from the first shift appliance, the shift dog 12 of the second shift appliance has an axial extension. For this extension, shift dog 12 has two overhanging pick up areas 13 and 13' for attaching the driving bolts 14 and 14', which again are in operative connection to the spindle drive 6. The driving bolts 14 and 14' are running in radial direction through an associated slot hole 18 in the second countershaft $w\_v2$. Because of the axial extension of the shift dog 12, the axial position of the spindle drive is not dependent on the idle wheels 2 and 3 that have to be shifted.

FIG. 3 displays an enlarged single piece view of the shift dog 12 of the second shift appliance with both axial overhanging pick-up areas 13 and 13'. Both pick-up areas 13 and 13' are attached to the shift dog 12 and are positioned opposite each other.

FIG. 4 displays an enlarged exemplified single piece view of idle wheel bearing 15 for swivel-mounting idle wheel 3. The bearing for idle wheel 15 shows two cut out areas 16 and 16' which correspond to the pick-up areas 13 and 13'. Thus it is possible that in the shift position, in which shift dog 12 connects idle wheel 3 for co-rotation with the second countershaft $w\_v2$, its pick-up areas 13 and 13' are fitted axially into the corresponding cut-out areas 16 and 16'. That means that the shift dog 12 is positioned at least partly in a radial way between the idle wheel mounting 15 and the second countershaft $w\_v2$, which is a hollow shaft.

FIG. 5 displays a three-dimensional partial view of the invention-based arrangement with both shift appliances on the second countershaft $w\_v2$ of the transmission. The constructive arrangement of the two shift appliances corresponds with the sectional view according to FIG. 1. FIG. 5 highlights especially that the axially overhanging pick up areas 9 and 9' of the sliding sleeve 7 of the first shift appliance can be guided into a groove 17 on the second countershaft $w\_v2$ in one shift position, in which sliding sleeve 7 or rather the associated shift dog 8 will engage idle wheel 1 to idle wheel 2, independently of the second countershaft $w\_v2$.

Finally FIG. 6 displays another three-dimensional partial view of the arrangement in line with the invention on the second countershaft w_v2.

REFERENCE NUMERALS 1 idle wheel
2 idle wheel
3 idle wheel
4 electric motor
5 spindle
6 spindle nut
7 sliding sleeve
8 shift dog
9, 9' overhanging pick-up areas on sliding sleeve
10 slot
11, 11' driving bolt
12 shifting dog on second shift appliance
13, 13' overhanging pick-up area on shift dog
14, 14' driving bolt
15 idle wheel mounting
16, 16' cut in idle wheel mounting
17 groove
18 slot hole
w_K1 first gearbox input shaft
w_K2 second gearbox input shaft
w_v1 first countershaft
w_v2 second countershaft

The invention claimed is:

1. A transmission arrangement for shifting at least one idle wheel, comprising: a hollow shaft; and a shift appliance, comprising:
an operating device being at least partially inside the hollow shaft along an axial direction of the hollow shaft; and
a shift device, comprising:
a sliding sleeve being coaxially sleeved over the hollow shaft and movable along the axial direction of the hollow shaft, and comprising:
an overhanging axial extension protruded from and extended beyond the sliding sleeve along the axial direction of the hollow shaft, wherein the overhanging axial extension is fixedly connected to the sliding sleeve, and
a radially protruding driving bolt fixed to the overhanging axial extension and attaching the overhanging axial extension to the operating device.

2. The transmission arrangement according to claim 1, wherein the shift device further comprises a shift dog swivel-mounted outside the sliding sleeve and configured to engage in the at least one idle wheel, and
the shift device is movable along the axial direction of the hollow shaft by the operating device of the shift appliance.

3. The transmission arrangement according to claim 1, wherein the hollow shaft comprises a groove so that at least a portion of the axial extension is partially guided into the groove in at least one shift position.

4. The transmission arrangement according to claim 1, wherein the driving bolt is positioned in a radial direction through a slot hole in the hollow shaft, configured to couple to the operating device of the shift appliance.

5. The transmission arrangement according to claim 1, wherein the hollow shaft is a countershaft in a double clutch transmission to shift at least one of a power shift gear and a winding path gear.

6. The transmission arrangement according to claim 1, wherein the shift device of the shift appliance is configured as one of a form-fit shift device and a frictional shift device.

7. A transmission arrangement for shifting at least one idle wheel, comprising: a hollow shaft; a first shift appliance and a second shift appliance; the first shift appliance comprising:
a first operating device being at least partially inside the hollow shaft along an axial direction of the hollow shaft, and
a first shift device, comprising:
a first sliding sleeve being coaxially sleeved over the hollow shaft and movable along the axial direction of the hollow shaft, and comprising:
a first overhanging axial extension protruded from and extended beyond the first sliding sleeve along the axial direction of the hollow shaft, wherein the first overhanging axial extension is fixedly connected to the first sliding sleeve, and
a first radially protruding driving bolt fixed to the first overhanging axial extension and attaching the first overhanging axial extension to the first operating device; and
the second shift appliance comprising:
a second shift device coupling with a shift dog and being coaxially sleeved over the hollow shaft and movable along the axial direction of the hollow shaft, and
a second operating device configured to move the shift dog in an axial direction of the hollow shaft,
wherein the shift dog comprises:
a second overhanging axial extension protruded from and extended beyond the shift dog along the axial direction of the hollow shaft, wherein the second overhanging axial extension is fixedly connected to the shift dog.

8. The transmission arrangement according to claim 7, wherein the second overhanging axial extension of the shift dog comprises a pick-up area configured to attach a second driving bolt.

9. The transmission arrangement according to claim 8, further comprising an idle wheel mounting sleeved over the hollow shaft, wherein in a shift position the shift dog is able to slide at least partially into a position between the idle wheel mounting and the hollow shaft in a radial way.

10. The transmission arrangement according to claim 9, wherein the idle wheel mounting comprises a cut out area corresponding to the pick-up area.

11. The transmission arrangement according to claim 8, wherein the pick-up area of the second axial extension of the shift dog connects to the second operating device by the second driving bolt.

12. The transmission arrangement according to claim 8, wherein the hollow shaft comprises a groove so that the pick-up area of the shift dog is partially guided into the groove in at least one shift position.

13. The transmission arrangement according to claim 11, wherein the second driving bolt is positioned in a radial direction through a slot hole in the shaft to couple to the second operating device of the second shift appliance.

14. The transmission arrangement according to claim 11, wherein the second operating device of the second shift appliance comprises a spindle drive, the spindle drive comprising:
a spindle;
a motor driving the spindle; and
a spindle nut mounted on the spindle and co-rotated with the spindle,
wherein the spindle nut operatively connected to the driving bolt and the spindle so that the motor drives the second driving bolt for movement in the axial direction.

15. The transmission arrangement according to claim 11, wherein the second driving bolt fits into a radial groove on the outside of the spindle nut.

16. The transmission arrangement according to claim 7, wherein the second shift device of the second shift appliance is configured as one of a form-fit shift device and a frictional shift device.

17. A transmission arrangement for shifting at least one idle wheel, comprising: a hollow shaft; and a shift appliance, the shift appliance comprising:
an operating device being at least partially inside the hollow shaft along an axial direction of the hollow shaft; and
a shift device, comprising:
a sliding sleeve being coaxially sleeved over the hollow shaft and movable along the axial direction of the hollow shaft, and comprising:
an overhanging axial extension protruded from and extended beyond the sliding sleeve along the axial direction of the hollow shaft, wherein the overhanging axial extension is fixedly connected to the sliding sleeve, and
a driving bolt fixed to the overhanging axial extension and attaching the overhanging axial extension to the operating device,
wherein the driving bolt is positioned in a radial direction through a slot hole in the shaft,
wherein the operating device of the shift appliance comprises a spindle drive, the spindle drive comprising a spindle, a motor driving the spindle, a spindle nut mounted on the spindle and co-rotated with the spindle, and
wherein the spindle nut is operatively connected to the driving bolt and the spindle so that the motor drives the driving bolt for movement in the axial direction.

18. The transmission arrangement according to claim 17, wherein the driving bolt fits into a radial groove on the outside of the spindle nut.

\* \* \* \* \*